(12) United States Patent
Yoon et al.

(10) Patent No.: US 9,754,352 B2
(45) Date of Patent: Sep. 5, 2017

(54) RECONFIGURABLE IMAGE SCALING CIRCUIT

(71) Applicant: SAMSUNG ELECTRONICS CO., LTD., Suwon-si (KR)

(72) Inventors: Sung-Chul Yoon, Hwaseong-si (KR); Min-soo Kim, Hwaseong-si (KR); Jae-Sop Kong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 14/644,383

(22) Filed: Mar. 11, 2015

(65) Prior Publication Data

US 2015/0262337 A1    Sep. 17, 2015

(30) Foreign Application Priority Data

Mar. 11, 2014   (KR) .......................... 10-2014-0028181

(51) Int. Cl.
*G06T 3/40* (2006.01)
*H04N 5/262* (2006.01)

(52) U.S. Cl.
CPC .......... *G06T 3/4092* (2013.01); *G06T 3/4007* (2013.01); *H04N 5/2628* (2013.01); *G06T 2200/16* (2013.01); *G06T 2200/28* (2013.01); *G06T 2210/36* (2013.01)

(58) Field of Classification Search
None
See application file for complete search history.

(56) References Cited

U.S. PATENT DOCUMENTS

| | | | | |
|---|---|---|---|---|
| 6,091,426 A | * | 7/2000 | Hauck | G06T 3/4023 345/24 |
| 6,801,674 B1 | * | 10/2004 | Turney | G06T 3/0006 348/580 |
| 7,627,198 B2 | | 12/2009 | Kondo et al. | |
| 7,941,001 B1 | * | 5/2011 | Sahu | G06T 3/0025 345/660 |
| 8,081,845 B2 | | 12/2011 | Chen | |
| 8,493,415 B2 | | 7/2013 | MacInnis et al. | |
| 2003/0169279 A1 | | 9/2003 | Oberoi et al. | |

(Continued)

FOREIGN PATENT DOCUMENTS

| | | |
|---|---|---|
| JP | 2008-236522 A | 10/2008 |
| KR | 10-2005-0093512 A | 9/2005 |
| KR | 10-2008-0076053 A | 8/2008 |

OTHER PUBLICATIONS

Turney, Robert D., and Chris H. Dick. "Real Time Image Rotation and Resizing, Algorithms and Implementations." CORE Solutions Group, Xilinx, Inc (1999).*

*Primary Examiner* — Kim Vu
*Assistant Examiner* — Nathan Bloom
(74) *Attorney, Agent, or Firm* — Sughrue Mion, PLLC

(57) ABSTRACT

A reconfigurable image scaling circuit includes a horizontal scalar, a bufferer, and a vertical scalar. The horizontal scalar is configured to generate a horizontally scaled image data by scaling an input image data horizontally. The bufferer includes a mapper and a plurality of buffers. The plurality of the buffers are configured to store the horizontally scaled image data. The vertical scalar is configured to generate an output image data by scaling the horizontally scaled image vertically using a vertical scaling method.

16 Claims, 10 Drawing Sheets

(56) References Cited

U.S. PATENT DOCUMENTS

| | | | |
|---|---|---|---|
| 2005/0140697 A1* | 6/2005 | Chen | G06T 3/4023 345/660 |
| 2007/0041662 A1 | 2/2007 | Jeffrey | |
| 2007/0132788 A1* | 6/2007 | Heo | G09G 5/02 345/660 |
| 2008/0018793 A1 | 1/2008 | Lee et al. | |
| 2010/0172599 A1 | 7/2010 | Choi | |
| 2013/0223764 A1 | 8/2013 | Tripathi et al. | |
| 2014/0085498 A1* | 3/2014 | Hatano | H04N 9/07 348/221.1 |

* cited by examiner

RECONFIGURABLE IMAGE SCALING CIRCUIT

CROSS-REFERENCE TO RELATED APPLICATION

This application claims priority from Korean Patent Application No. 10-2014-0028181, filed on Mar. 11, 2014, in the Korean Intellectual Property Office (KIPO), the disclosure of which is incorporated by reference in its entirety.

BACKGROUND

1. Technical Field

Exemplary embodiments relate to image scaling. In particular, exemplary embodiments relate to an image scaling circuit which may reconfigure an order of scaling and a mapping relation of a bufferer.

2. Discussion of the Related Art

In a related art, a mobile system which includes a mobile application processor uses a high-definition display and a high-definition camera. A low-definition image, which is received from an external system, may be extended and displayed in the mobile system. A high-definition image, which is received from the high-definition camera, may be reduced and displayed in the mobile system. Therefore, an image scaling circuit is required to both extend and reduce an image.

In view of the above, there is a need for a reconfigurable image scaling circuit, which may execute extending or reducing an image for various cases with limited resources.

SUMMARY

At least one exemplary embodiment provides an image scaling circuit which may reconfigure an order of scaling and a mapping relation of a bufferer.

According to an aspect of an exemplary embodiment, a reconfigurable image scaling circuit includes a horizontal scalar, a bufferer, and a vertical scalar. The horizontal scalar is configured to generate a horizontally scaled image data by scaling an input image data horizontally. The bufferer includes a mapper and a plurality of buffers. The plurality of the buffers are configured to store the horizontally scaled image data. The vertical scalar is configured to generate an output image data by scaling the horizontally scaled image vertically using a vertical scaling method. The horizontally scaled image data, which is stored in the plurality of the buffers, includes a plurality of first row data. The output image data includes a second row data. The vertical scaling method generates the second row data based on a plurality of reference row data included in the plurality of the first row data. The mapper changes a mapping relation between the plurality of the reference row data and the plurality of the buffers based on a number of the plurality of the reference row data.

In an exemplary embodiment, the reconfigurable image scaling circuit may further include a controller configured to generate a control signal which represents the number of the plurality of the reference row data.

In an exemplary embodiment, the controller may include a first register and a second register. The first register may store a user-defined value. The second register may store a number of a plurality of first pixel data included in a row data included in the input image data. The second register may be configured to store a number of a plurality of second pixel data included in a row data included in the output image data.

In an exemplary embodiment, the number of the plurality of the reference row data may be determined based on the user-defined value.

In an exemplary embodiment, the number of the plurality of the reference row data may be determined based on the number of the plurality of the first pixel data and the number of the plurality of the second pixel data.

In an exemplary embodiment, the number of the plurality of the reference row data may be inversely proportional to the number of the plurality of the first pixel data in response to the number of the plurality of the first pixel data being smaller than the number of the plurality of the second pixel data.

In an exemplary embodiment, the number of the plurality of the reference row data may be inversely proportional to the number of the plurality of the second pixel data in response to the number of the plurality of the first pixel being bigger than the number of the plurality of the second pixel data.

In an exemplary embodiment, the controller may further include a mode storage configured to store a mode signal. The reconfigurable image scaling circuit may operate in a first mode or a second mode according to the mode signal. The number of the plurality of the reference row data may be determined based on the user-defined value in the first mode. The number of the plurality of the reference row data may be determined based on the number of the plurality of the first pixel data and the number of the plurality of the second pixel data in the second mode.

According to an aspect of an exemplary embodiment, a reconfigurable image scaling circuit includes a bufferer, a vertical scalar, a horizontal scalar, and a controller. The bufferer includes a mapper and a plurality of buffers. The controller includes a first register and a second register. The first register may be configured to store a user-defined value. The second register may be configured to store a number of a plurality of first pixel data included in a row data included in an input image data and a number of a plurality of second pixel data included in a row data included in an output image data. In response to the number of the plurality of the first pixel data being smaller than the number of the plurality of the second pixel data, the plurality of the buffers store the input image data, the vertical scalar generates a vertically extended image data by extending the input image data vertically, and the horizontal scalar generates the output image data by extending the vertically extended image data horizontally. In response to the number of the plurality of the first pixel data being bigger than the number of the plurality of the second pixel data, the horizontal scalar generates a horizontally reduced image data by reducing the input image data horizontally, the plurality of the buffers store the horizontally reduced image data, and the vertical scalar generates the output image data by reducing the horizontally reduce image data vertically.

In an exemplary embodiment, in response to the number of the plurality of the first pixel data being smaller than the number of the plurality of the second pixel data, the vertical scalar may generate the vertically extended image data based on a first vertical scaling method, the input image data may include a plurality of first row data, the vertically extended image data may include a second row data, the first vertical scaling method may generate the second row data based on a plurality of first reference row data included in the plurality of the first row data, and the mapper may change a mapping relation between the plurality of the first reference row data and the plurality of the buffers based on a number of the plurality of the first reference row data.

In an exemplary embodiment, in response to the number of the plurality of the first pixel data being bigger than the number of the plurality of the second pixel data, the vertical scalar may generate the output image data based on a second vertical scaling method, the vertically reduced image data may include a plurality of third row data, the output image data may include a fourth row data, the second vertical scaling method may generate the fourth row data based a plurality of second reference row data included in the plurality of the third row data, and the mapper may change the mapping relation between the plurality of the second reference row data and the plurality of the buffers based on a number of the plurality of the second reference row data.

In an exemplary embodiment, the number of the plurality of the first reference row data and the number of the plurality of the second reference row data may be determined based on the user-defined value.

In an exemplary embodiment, the number of the plurality of the first reference row data may be determined based on the number of the plurality of the first pixel data, the number of the plurality of the second reference row data may be determined based on the number of the plurality of the second pixel data.

In an exemplary embodiment, the number of the plurality of the first reference row data and the number of the plurality of the second reference row data may be determined based on the user-defined value in a first mode. The number of the plurality of the first reference row data may be determined based on the number of the plurality of the first pixel data, the number of the plurality of the second reference row data may be determined based on the number of the plurality of the second pixel data in a second mode.

In an exemplary embodiment, the controller may further include a mode storage configured to store a mode signal. The reconfigurable image scaling circuit may operate in the first mode or the second mode according to the mode signal.

According to an aspect of an exemplary embodiment, a method of determining a number of a plurality of reference row data by a controller included in a reconfigurable image scaling circuit includes determining whether a mode signal stored in a mode storage is deactivated and the number of the plurality of the reference row data is fixed, determining the number of the plurality of the reference row data based on a user-defined value stored in a first register of the controller in response to the mode signal being deactivated and the number of the plurality of reference row data being fixed, and determining the number of the plurality of the reference row data based on a number of a plurality of first pixel data and a number of a plurality of second pixel data, which are stored in a second register of the controller, in response to the mode signal being activated and the number of the plurality of the reference row data not being fixed.

As described above, a reconfigurable image scaling circuit according to exemplary embodiments may generate an output image data having an optimized image quality by changing a mapping relation between a plurality of reference row data, which are used in a vertical scaling, and a plurality of buffers.

In addition, the reconfigurable image scaling circuit according to exemplary embodiments may generate a large-size output image data by executing a horizontal scaling after executing a vertical scaling when the reconfigurable image scaling circuit operates as an image extending circuit. The reconfigurable image scaling circuit according to exemplary embodiments may receive a large-size input image data by executing the vertical scaling after executing the horizontal scaling when the reconfigurable image scaling circuit operates as an image reducing circuit.

BRIEF DESCRIPTION OF THE DRAWINGS

Exemplary embodiments will be more clearly understood from the following detailed description taken in conjunction with the accompanying drawings.

DETAILED DESCRIPTION OF THE EXEMPLARY EMBODIMENTS

Figure 1:
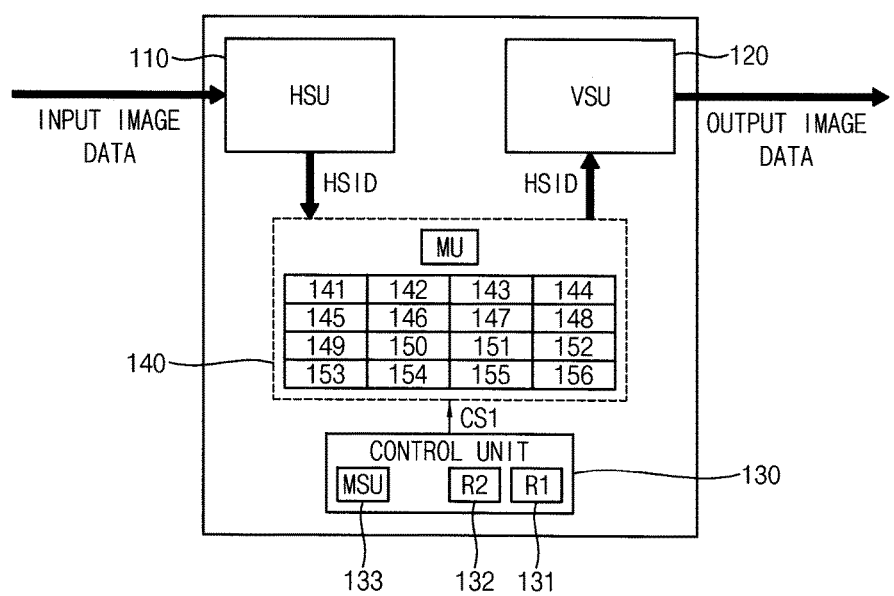
FIGS. 1 and 2 are block diagrams illustrating reconfigurable image scaling circuits according to exemplary embodiments.

Various exemplary embodiments will be described more fully hereinafter with reference to the accompanying drawings, in which some exemplary embodiments are shown. The exemplary embodiments may, however, be embodied in many different forms and should not be construed as limited to the exemplary embodiments set forth herein. Rather, these exemplary embodiments are provided so that this disclosure will be thorough and complete, and will fully convey the scope of the exemplary embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the exemplary embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
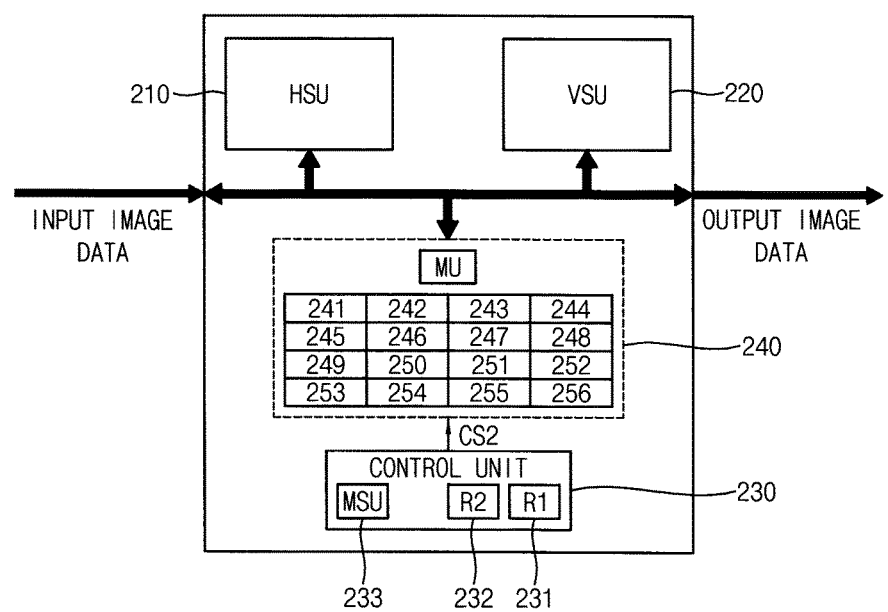

FIGS. 1 and 2 are block diagrams illustrating reconfigurable image scaling circuits according to exemplary embodiments.

Referring to FIG. 1, a reconfigurable image scaling circuit 100 includes a horizontal scalar HSU 110, a bufferer 140, a vertical scalar VSU 120, and a controller CONTROL UNIT 130. The bufferer 140 includes a mapper MU and a plurality of buffers 141 through 156. The controller 130 includes a first register R1 131, a second register R2 132, and a mode storage MSU 133.

The horizontal scalar HSU 110 generates a horizontally scaled image data HSID by scaling an input image data INPUT IMAGE DATA horizontally. The horizontal scaling method will be described with the references to FIGS. 3 and 4.

The controller 130 may generate a control signal CS1 representing the number of a plurality of reference row data. The first register R1 131 may store a user-defined value. The second register R2 132 may store the number of a plurality of first pixel data included in a row data included in the input image data INPUT IMAGE DATA. The second register R2 132 may store the number of a plurality of second pixel data included in a row data included in the output image data OUTPUT IMAGE DATA. The mode storage MSU 133 stores a mode signal.

In a first exemplary embodiment, the number of the plurality of the reference row data may be determined based on the user-defined value.

In a second exemplary embodiment, the number of the plurality of the reference row data may be determined based the number of the plurality of the first pixel data and the number of the plurality of the second pixel data.

In a third exemplary embodiment, the reconfigurable image scaling circuit 100 may operate in a first mode or a second mode according to the mode signal. The number of the plurality of the reference row data may be determined based on the user-defined value in the first mode, and the number of the plurality of the reference row data may be determined based on the number of the plurality of the first pixel data and the number of the plurality of the second pixel data in the second mode. The third exemplary embodiment will be described with reference to FIG. 8.

The mapper MU changes a mapping relation between the plurality of the reference row data and the plurality of the buffers 141 through 156 based on a number of the plurality of the reference row data. The bufferer 140 may contain more or less buffers than the plurality of the buffers 141 through 156. The plurality of the buffers 141 through 156 may store the horizontally scaled image data HSID according to information of the mapper MU.

The vertical scalar VSU 120 generates the output image data OUTPUT IMAGE DATA by scaling the horizontally scaled image HSID vertically using a vertical scaling method. The horizontally scaled image data (HSID), which is stored in the plurality of the buffers 141 through 156, includes a plurality of first row data. The output image data OUTPUT IMAGE DATA includes a second row data. The vertical scaling method generates the second row data based on the plurality of the reference row data included in the plurality of the first row data. The mapping relation between a plurality of a reference row data and the plurality of the buffers 141 through 156 will be described with the references to FIGS. 5 through 7.

Referring to FIG. 2, a reconfigurable image scaling circuit 200 includes a bufferer 240, a vertical scalar VSU 220, a horizontal scalar HSU 210, and a controller CONTROL UNIT 230.

When the number of the plurality of the first pixel data is smaller than the number of the plurality of the second pixel data, the reconfigurable image scaling circuit 200 generates the output image data OUTPUT IMAGE DATA by extending the input image data INPUT IMAGE DATA, the plurality of the buffers 241 through 256 store the input image data INPUT IMAGE DATA, the vertical scalar VSU 220 generates a vertically extended image data by extending the input image data INPUT IMAGE DATA vertically, and the horizontal scalar HSU 210 generates the output image data OUTPUT IMAGE DATA by extending the vertically extended image data horizontally.

The vertical scalar VSU 220 may generate the vertically extended image data based on a first vertical scaling method. The input image data INPUT IMAGE DATA may include a plurality of first row data. The vertically extended image data may include a second row data. The first vertical scaling method may generate the second row data based on a plurality of first reference row data included in the plurality of the first row data. The mapper MU may change a mapping relation between the plurality of the first reference row data and the plurality of the buffers 241 through 256 based on a number of the plurality of the first reference row data.

The first vertical scaling method will be described with the references to FIGS. 5 through 7.

In this case, the reconfigurable image scaling circuit 200 may generate the output image data OUTPUT IMAGE DATA having a larger size than the reconfigurable image scaling circuit 200 in a case that executing of the vertical scalar 220 is performed after executing of the horizontal scalar 210.

When the number of the plurality of the first pixel data is bigger than the number of the plurality of the second pixel data, the reconfigurable image scaling circuit 200 generates the output image data OUTPUT IMAGE DATA by reducing the input image data INPUT IMAGE DATA, the horizontal scalar HSU 210 generates a horizontally reduced image data by reducing the input image data horizontally INPUT IMAGE DATA, the plurality of the buffers 241 through 256 store the horizontally reduced image data, and the vertical scalar VSU 220 generates the output image data OUTPUT IMAGE DATA by reducing the horizontally reduce image data vertically.

The vertical scalar VSU 220 may generate the output image data OUTPUT IMAGE DATA based on a second vertical scaling method. The vertically reduced image data may include a plurality of third row data. The output image data OUTPUT IMAGE DATA may include a fourth row data. The second vertical scaling method may generate the fourth row data based a plurality of second reference row data included in the plurality of the third row data. The mapper MU may change the mapping relation between the plurality of the second reference row data and the plurality of the buffers 241 through 256 based on a number of the plurality of the second reference row data.

The second vertical scaling method will be described with the references to FIGS. 5 through 7.

In this case, the reconfigurable image scaling unit 200 may receive the input image data INPUT IMAGE DATA having a larger size than the reconfigurable image scaling circuit 200 in a case that executing of the horizontal scalar HSU 210 is performed after executing of the vertical scalar VSU 220.

The controller 230 includes a first register R1 231, a second register R2 232, and a mode storage MSU 233. The first register R1 231 stores a user-defined value. The second register R2 232 may store a number of a plurality of first pixel data included in a row data included in the input image data INPUT IMAGE DATA and a number of a plurality of second pixel data included in a row data included in the output image data OUTPUT IMAGE DATA. The mode storage MSU 233 stores a mode signal. The controller 230 generates a control signal CS2 representing the number of the plurality of the first reference row data or the number of the plurality of the second reference row data.

In a first exemplary embodiment, the number of the plurality of the first reference row data and the number of the plurality of the second reference row data may be determined based on the user-defined value.

In a second exemplary embodiment, the number of the plurality of the first reference row data may be determined based on the number of the plurality of the first pixel data, the number of the plurality of the second reference row data may be determined based on the number of the plurality of the second pixel data.

In a third exemplary embodiment, the number of the plurality of the first reference row data and the number of the plurality of the second reference row data may be determined based on the user-defined value in a first mode, and the number of the plurality of the first reference row data may be determined based on the number of the plurality of the first pixel data, the number of the plurality of the second reference row data may be determined based on the number of the plurality of the second pixel data in a second mode. The reconfigurable image scaling circuit 200 may operate in the first mode or the second mode according to the mode signal. The third exemplary embodiment will be described with reference to FIG. 8.

Figure 3:
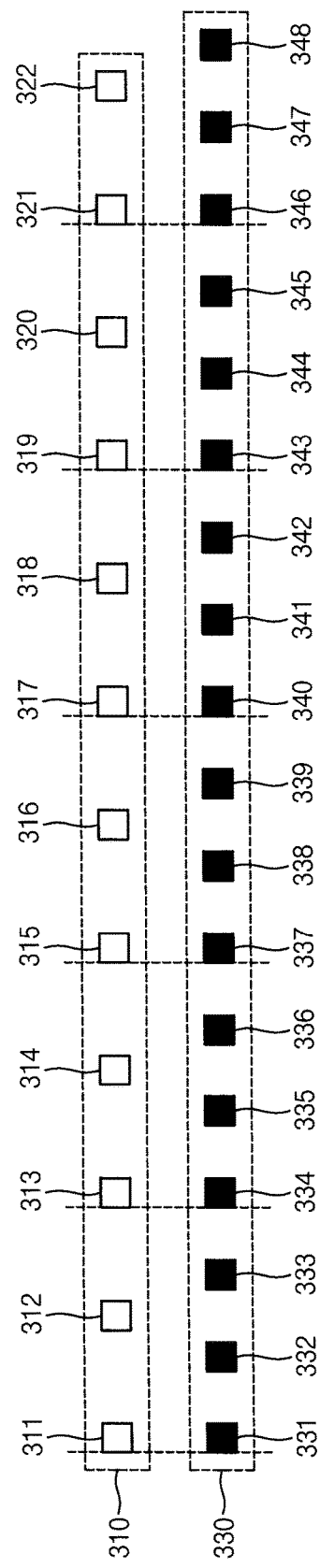
FIGS. 3 and 4 are diagrams illustrating operation of the vertical scalar included in the reconfigurable image scaling circuit of FIG. 1.
Figure 4:
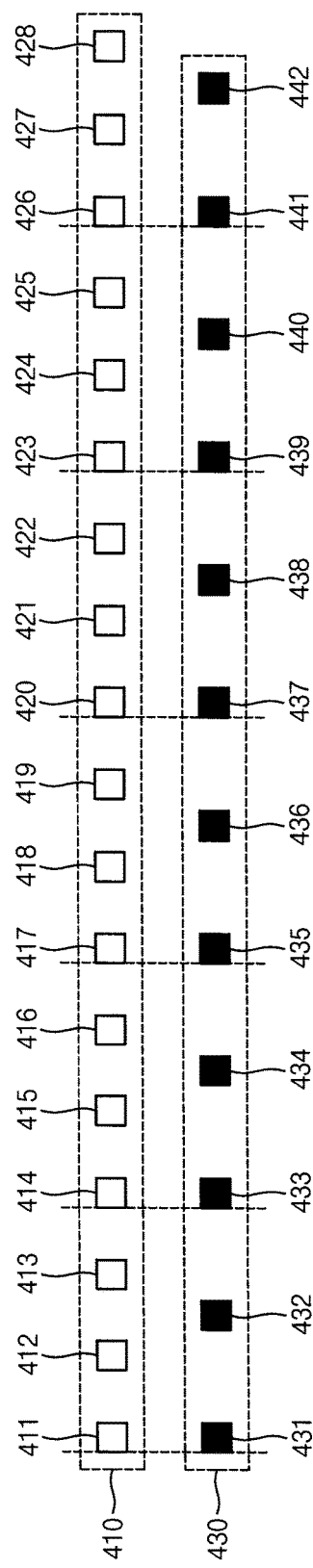

FIGS. 3 and 4 are diagrams illustrating operation of the vertical scalar included in the reconfigurable image scaling circuit of FIG. 1.

When FIG. 3 describes operation of the horizontal scalar HSU 110 included in the reconfigurable image scaling circuit 100 (a first exemplary embodiment), a first row data 310 may be a row data included in the input image data INPUT IMAGE DATA of the reconfigurable image scaling circuit 100 of FIG. 1, a second row data 330 may correspond to the first row data 310, and the second row data 330 may be a row data included in the horizontally scaled image data HSID of the reconfigurable image scaling circuit 100 of FIG. 1.

When FIG. 3 describes operation of the horizontal scalar 210 included in the reconfigurable image scaling circuit 200 operating as an image extending circuit (a second exemplary embodiment), the first row data 310 may be a row data included in the vertically scaled image data of the reconfigurable image scaling circuit 200 of FIG. 2, the second row data 330 may correspond to the first row data 310, the second row data 330 may be a row data included in the output image data OUTPUT IMAGE DATA of the reconfigurable image scaling circuit 200 of FIG. 2.

When FIG. 3 describes operation of the horizontal scalar 210 included in the reconfigurable image scaling circuit 200 operating as an image reducing circuit (a third exemplary embodiment), the first row data 310 may be a row data included in the input image data INPUT IMAGE DATA of the reconfigurable image scaling circuit 200 of FIG. 2, the second row data 330 may correspond to the first row data 310, and the second row data 330 may be a row data included in the horizontally scaled image data of the reconfigurable image scaling circuit 200 of FIG. 2.

Referring to FIG. 3, the first row data 310 may include a plurality of pixel data 311 through 322. The second row data 330 may include a plurality of pixel data 331 through 348. FIG. 3 describes a process to generate the second row data 330 by extending the first row data 310.

To generate a pixel data included in the second row data 330, neighboring 8 pixel data, neighboring 10 pixel data, or neighboring 12 pixel data may be referenced. The neighboring 8 pixel data, the neighboring 10 pixel data, and the neighboring 12 pixel data are included in the first row data 310. These are called a horizontal 8 tap scaling, a horizontal 10 tap scaling, and a horizontal 12 tap scaling, respectively.

For example, to scale a pixel data 339 included in the second row data 330, a plurality of first pixel data 313 through 320 may be referenced in the horizontal 8 tap scaling, a plurality of second pixel data 312 through 321 may be referenced in the horizontal 10 tap scaling, and a plurality of third pixel data 311 through 322 may be referenced in the horizontal 12 tap scaling.

Horizontal scaling of the other pixels 331 through 338, and 340 through 348 included in the second row data 330 may be understood based on the horizontal scaling of the pixel data 339.

Referring to FIG. 4, a third row data 410 may correspond to the first row data 310, a fourth row data 430 may correspond to the second row data 330. The third row data 410 may include a plurality of pixel data 411 through 428. The fourth row data 430 may include a plurality of pixel data 431 through 442. FIG. 4 describes a process to generate the fourth row data 430 by reducing the third row data 410.

For example, to scale a pixel data 436 included in the fourth row data 430, a plurality of first pixel data 415 through 422 may be referenced in the horizontal 8 tap scaling, a plurality of second pixel data 416 through 423 may be referenced in the horizontal 10 tap scaling, and a plurality of third pixel data 417 through 424 may be referenced in the horizontal 12 tap scaling.

Horizontal scaling of the other pixels 431 through 435, and 437 through 442 included in the fourth row data 430 may be understood based on the horizontal scaling of the pixel data 436.

Figure 5:
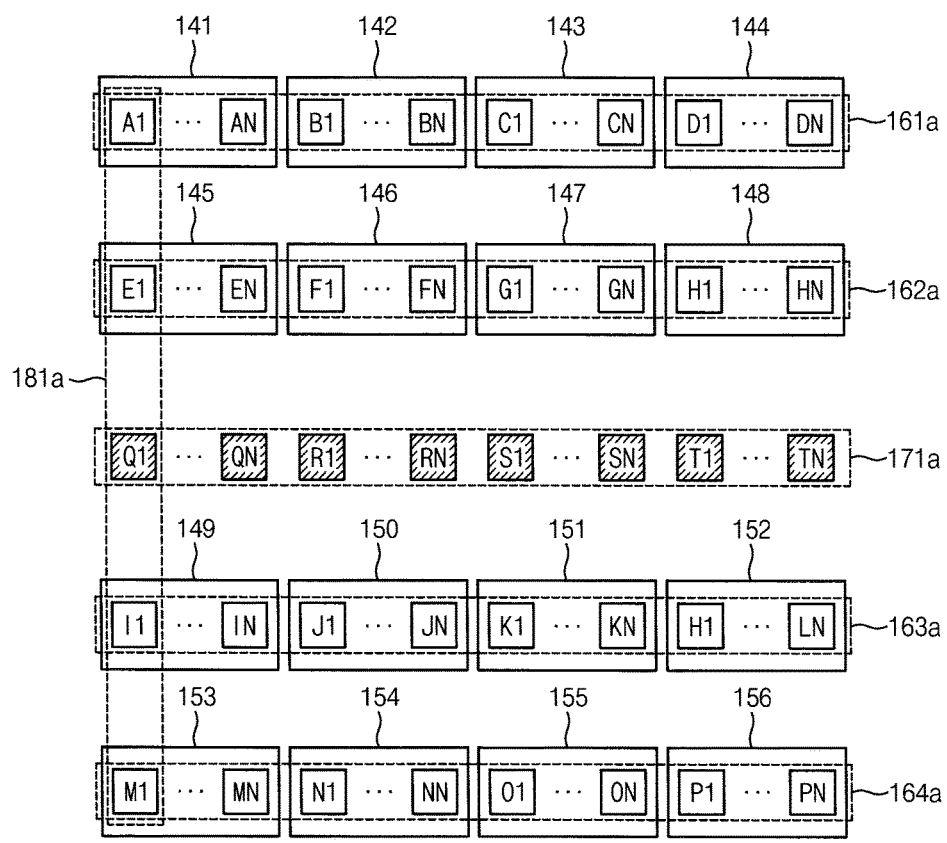
FIGS. 5 through 7 are block diagrams illustrating exemplary embodiments of the bufferer included in the reconfigurable image scaling circuit of FIG. 1.
Figure 6:
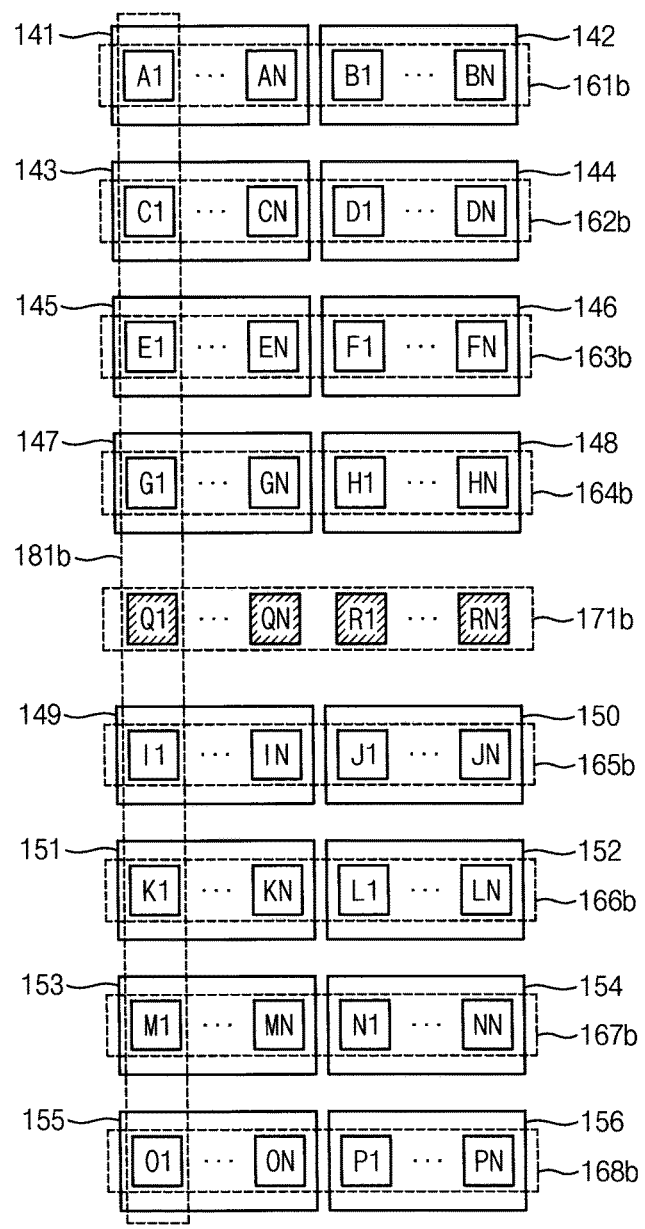
Figure 7:
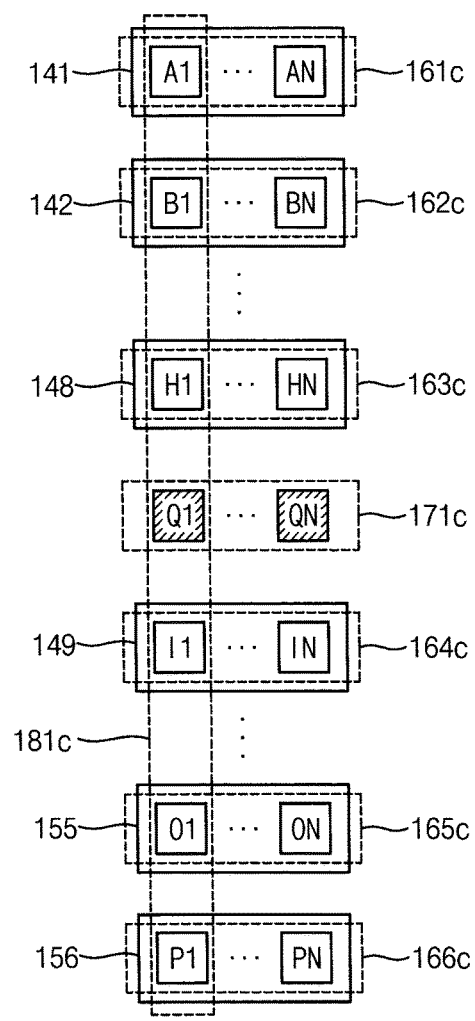

FIGS. 5 through 7 are block diagrams illustrating exemplary embodiments of the bufferer included in the reconfigurable image scaling circuit of FIG. 1.

When FIGS. 5 through 7 describe operation of the vertical scalar 120 included in the reconfigurable image scaling circuit 100 (a first exemplary embodiment), a first reference row data 161a, 161b, or 161c may be a row data included in the horizontally scaled image data HSID of the reconfigurable image scaling circuit 100 of FIG. 1, a result row data 171a, 171b, or 171c may be a row data included in the output image data OUTPUT IMAGE DATA of the reconfigurable image scaling circuit 100 of FIG. 1.

When FIGS. 5 through 7 describe operation of the vertical scalar 220 included in the reconfigurable image scaling circuit 200 of FIG. 2 operating as an image extending circuit (a second exemplary embodiment), the first reference row data 161a, 161b, or 161c may be a row data included in the input image data INPUT IMAGE DATA of the reconfigurable image scaling circuit 200 of FIG. 2, the result row data 171a, 171b, or 171c may be a row data included in the vertically scaled image data of the reconfigurable image scaling circuit 200 of FIG. 2.

When FIGS. 5 through 7 describe operation of the vertical scalar 220 included in the reconfigurable image scaling circuit 200 of FIG. 2 operating as an image reducing circuit (a third exemplary embodiment), the first reference row data 161a, 161b, or 161c may be a row data included in the horizontally scaled image data of the reconfigurable image scaling circuit 200 of FIG. 2, the result row data 171a, 171b, or 171c may be a row data included in the output image data OUTPUT IMAGE DATA of the reconfigurable image scaling circuit 200 of FIG. 2.

Referring to FIG. 5, the bufferer 140a may include 16 buffers 141 through 156. Each of the buffers 141 through 156 may store N pixel data.

When the first reference row data 161a corresponds to a (N)-th row of an image, a second reference row data 162a may correspond to a (N+1)-th row of the image, a third reference row data 163a may correspond to a (N+2)-th row of the image, and a fourth reference row data 164a may correspond to a (N+3)-th row of the image.

The first reference row data 161a includes a first pixel data A1 through a (N)-th pixel data AN, a (N+1)-th pixel data B1 through a (2N)-th pixel data BN, a (2N+1)-th pixel data C1 through a (3N)-th pixel data CN, and a (3N+1)-th pixel data D1 through a (4N)-th pixel data DN. Because the first reference row data 161a can not be stored in a buffer, the first pixel data A1 through the (N)-th pixel data AN may be stored in a first buffer 141, the (N+1)-th pixel data B1 through the (2N)-th pixel data BN may be stored in a second buffer 142, the (2N+1)-th pixel data C1 through the (3N)-th pixel data CN may be stored in a third buffer 143, and the (3N+1)-th pixel data D1 through the (4N)-th pixel data DN may be stored in a fourth buffer 144. The mapping relation between the second through fourth reference row data 162a, 163a, and 164a and the other buffers 145 through 156 may be understood based on the mapping relation between the first reference row data 161a and buffers 141 through 144. The mapping relation may be stored in the mapper MU included in the reconfigurable image scaling circuit 100 of FIG. 1 or the mapper MU included in the reconfigurable image scaling circuit 200 of FIG. 2.

In this case, the number of the reference row data is determined as 4. The vertical scalar 120 or 220 may generate the first result row data 171a by a vertical 4 tap scaling with the first reference row data 161a, the second reference row data 162a, the third reference row data 163a, and the fourth reference row data 164a. The first result row data 171a includes a first result pixel data Q1 through a (N)-th result pixel data QN, a (N+1)-th result pixel data R1 through a (2N)-th result pixel data RN, a (2N+1)-th result pixel data Si through a (3N)-th result pixel data SN, and a (3N+1)-th result pixel data T1 through a (4N)-th result pixel data TN. The vertical scalar 120 or 220 may generate the first result pixel data Q1 included in the first result row data 171a by the vertical 4 tap scaling with a plurality of pixel data A1, E1, I1, and M1. Description of the other result pixel data included in the first result row data 171a may be understood with the description of the first result pixel data Q1.

Referring to FIG. 6, when the first reference row data 161b corresponds to a (N)-th row of an image, a second reference row data 162b may correspond to a (N+1)-th row of the image, a third reference row data 163b may correspond to a (N+2)-th row of the image, a fourth reference row data 164b may correspond to a (N+3)-th row of the image, a fifth reference row data 165b may correspond to a (N+4)-th row of the image, a sixth reference row data 166b may correspond to a (N+5)-th row of the image, a seventh reference row data 167b may correspond to a (N+6)-th row of the image, and a eighth reference row data 168b may correspond to a (N+7)-th row of the image.

The first reference row data 161b includes a first pixel data A1 through a (N)-th pixel data AN, and a (N+1)-th pixel data B1 through a (2N)-th pixel data BN. Because the first reference row data 161b can not be stored in a buffer, the first pixel data A1 through the (N)-th pixel data AN may be stored in the first buffer 141, and the (N+1)-th pixel data B1 through the (2N)-th pixel data BN may be stored in the second buffer 142. The mapping relation between the second through eighth reference row data 162b through 168b and the other buffers 143 through 156 may be understood based on the mapping relation between the first reference row data 161b and the buffers 141, 142. The mapping relation may be stored in the mapper MU included in the reconfigurable image scaling circuit 100 of FIG. 1 or the mapper MU included in the reconfigurable image scaling circuit 200 of FIG. 2.

In this case, the number of the reference row data is determined as 8. The vertical scalar 120 or 220 may generate the first result row data 171b by a vertical 8 tap scaling with the first through eighth reference row data 161b through 168b. The first result row data 171b includes a first result pixel data Q1 through a (N)-th result pixel data QN, and a (N+1)-th result pixel data R1 through a (2N)-th result pixel data RN. The vertical scalar 120 or 220 may generate the first result pixel data Q1 included in the first result row data 171b by the vertical 8 tap scaling with a plurality of pixel data A1, C1, E1, G1, I1, K1, M1, and O1. Description of the other result pixel data included in the first result row data 171b may be understood with the description of the first result pixel data Q1.

Because each of 2N result pixel data included in the first result row data 171b executes the vertical 8 tap scaling, 2N result pixel data included in the first result row data 171b of FIG. 6 may have a higher image quality than 4N result pixel data included in the first result row data 171a of FIG. 5.

Referring to FIG. 7, a first reference row data 161c includes a first pixel data A1 through a (N)-th pixel data AN. The first pixel data A1 through the (N)-th pixel data AN may be stored in the first buffer 141. A second reference row data 162c includes a (N+1)-th pixel data B1 through a (2N)-th pixel data BN. The (N+1)-th pixel data B1 through the (2N)-th pixel data BN may be stored in the second buffer 142. The mapping relation between the second through sixteenth reference row data 162c through 166c and the other buffers 142 through 156 may be understood based on the mapping relation between the first reference row data 161c and buffers 141. The mapping relation may be stored in the mapper MU included in the reconfigurable image scaling circuit 100 of FIG. 1 or the mapper MU included in the reconfigurable image scaling circuit 200 of FIG. 2.

In this case, the number of the reference row data is determined as 16. The vertical scalar 120 or 220 may generate the first result row data 171c by a vertical 16 tap scaling with the first through sixteenth reference row data 161c through 166c. The first result row data 171c includes a first result pixel data Q1 through a (N)-th result pixel data QN. The vertical scalar 120 or 220 may generate the first result pixel data Q1 included in the first result row data 171c by the vertical 16 tap scaling with a plurality of pixel data A1, B1 through H1, I1 through O1, and P1. Description of the other result pixel data included in the first result row data 171c may be understood with the description of the first result pixel data Q1.

Because each of N result pixel data included in the first result row data 171c executes the vertical 16 tap scaling, N result pixel data included in the first result row data 171c of FIG. 7 may have a higher image quality than 4N result pixel data included in the first result row data 171a of FIG. 5 or 2N result pixel data included in the first result row data 171b of FIG. 6.

Figure 8:
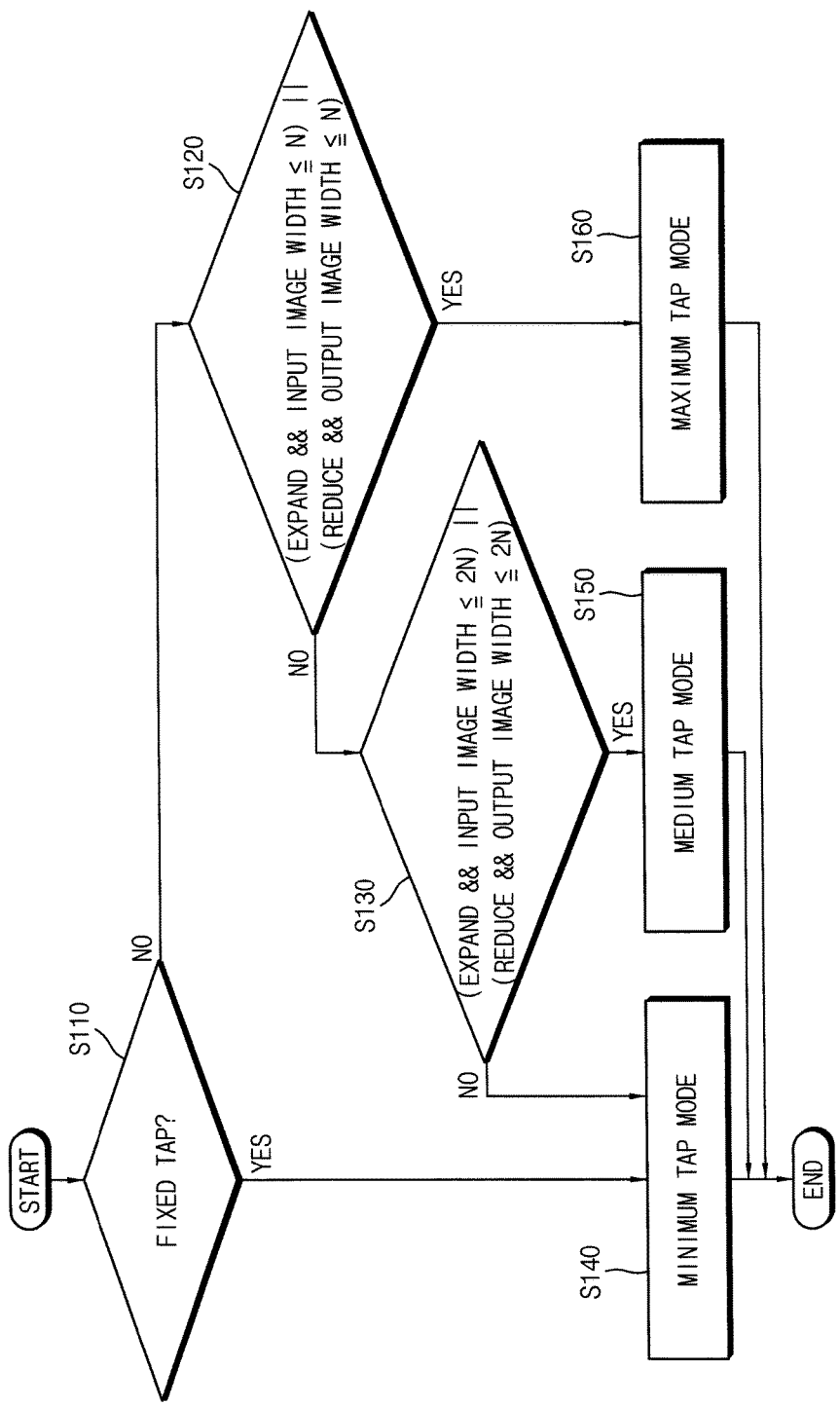
FIG. 8 is a flow chart illustrating determining the number of the plurality of the reference row data by the controller included in the reconfigurable image scaling circuit of FIG. 1.

FIG. 8 is a flow chart illustrating determining the number of the plurality of the reference row data by the controller included in the reconfigurable image scaling circuit of FIG. 1. The flow chart of FIG. 8 describes an exemplary embodiment that the number of the buffers included in the reconfigurable image scaling circuit 100 is 16, and each of the buffers may store N pixel data.

Referring to FIG. 8, when the mode signal stored in the mode storage 133 is deactivated and the number of the plurality of the reference row data is fixed (S110: YES) in a first case, the number of the plurality of the reference row data may be determined based on the user-defined value stored in the first register 131. Because FIG. 8 describes the case that the user-defined value is 4, which is a minimum number of the plurality of the reference row data, when the number of the plurality of the reference row data is fixed (S110: YES), the number of the plurality of the reference row data is determined as 4, which is the minimum number of the plurality of the reference row data (S140). In this case, the bufferer 140 may be reconfigured as the bufferer 140a of FIG. 5.

When the mode signal stored in the mode storage 133 is activated and the number of the plurality of the reference row data is not fixed (S110: NO), in a second case, the number of the plurality of the reference row data may be determined based the number of the plurality of the first pixel data INPUT IMAGE WIDTH and the number of the plurality of the second pixel data OUTPUT IMAGE WIDTH, which are stored in the second register 132.

When the number of the plurality of the first pixel data INPUT IMAGE WIDTH is smaller than the number of the plurality of the second pixel data OUTPUT IMAGE WIDTH, in other words, the reconfigurable image scaling circuit 100 of FIG. 1 operates as an image extending circuit (EXPAND), the number of the plurality of the reference row data may be inversely proportional to the number of the plurality of the first pixel data INPUT IMAGE WIDTH. When the number of the plurality of the first pixel INPUT IMAGE WIDTH is bigger than the number of the plurality of the second pixel data OUTPUT IMAGE WIDTH, in other words, the reconfigurable image scaling circuit 100 of FIG. 1 operates as an image reducing circuit (REDUCE), the number of the plurality of the reference row data may be inversely proportional to the number of the plurality of the second pixel data OUTPUT IMAGE WIDTH.

When the number of the plurality of the reference row data is not fixed (S110: NO), the reconfigurable image scaling circuit 100 of FIG. 1 operates as an image extending circuit (EXPAND) and the number of the plurality of the first pixel data INPUT IMAGE WIDTH is equal to or smaller than N or the reconfigurable image scaling circuit 100 of FIG. 1 operates as an image reducing circuit (REDUCE) and the number of the plurality of the second pixel data OUTPUT IMAGE WIDTH is equal to or smaller than N (S120: YES), the number of the plurality of the reference row data is determined as 16, which is a maximum number of the plurality of the reference row data (S160). In this case, the bufferer 140 may be reconfigured as the bufferer 140c of FIG. 7.

In contrast (S120: NO), when the reconfigurable image scaling circuit 100 of FIG. 1 operates as an image extending circuit (EXPAND) and the number of the plurality of the first pixel data INPUT IMAGE WIDTH is equal to or smaller than 2N or the reconfigurable image scaling circuit 100 of FIG. 1 operates as an image reducing circuit (REDUCE) and the number of the plurality of the second pixel data OUTPUT IMAGE WIDTH is equal to or smaller than 2N (S130: YES), the number of the plurality of the reference row data is determined as 8, which is a medium number of the plurality of the reference row data (S150). In this case, the bufferer 140 may be reconfigured as the bufferer 140b of FIG. 6.

In contrast (S130: NO), the number of the reference row data is determined as 4, which is the minimum number of the plurality of the reference row data (S140). In this case, the bufferer 140 may be reconfigured as the bufferer 140a of FIG. 5.

The flow chart of FIG. 8 may be applied to the reconfigurable image scaling circuit 200 of FIG. 2. Determining the number of the plurality of the reference row data by the controller 130 may be embodied in various ways other than the method of FIG. 8.

Figure 9:
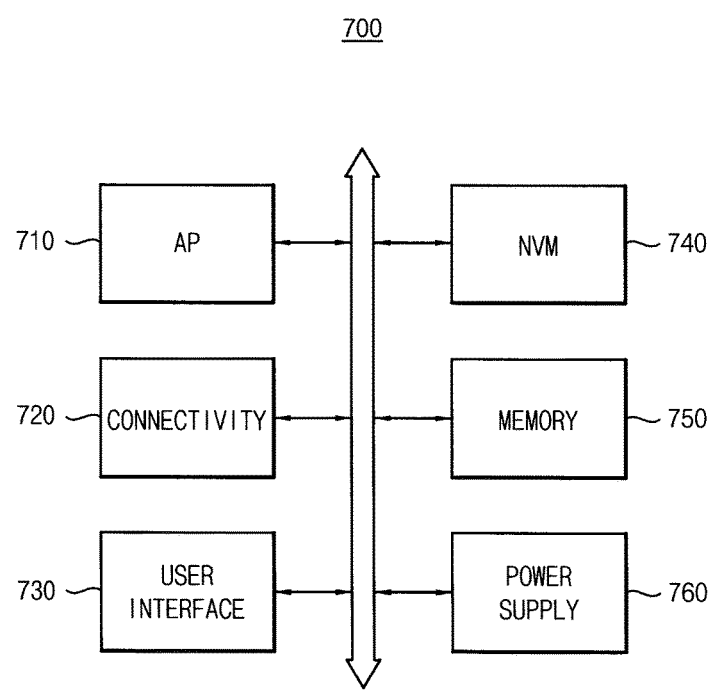
FIG. 9 is a diagram illustrating a mobile system including a reconfigurable image scaling circuit according to exemplary embodiments.

FIG. 9 is a diagram illustrating a mobile system including a reconfigurable image scaling circuit according to exemplary embodiments.

Referring to FIG. 9, a mobile system 700 includes an application processor (AP) 710, a connectivity unit 720, a memory device 750, a nonvolatile memory (NVM) device 740, a user interface 730, a bus 770, and a power supply 760. In an exemplary embodiment the mobile system 700 may be a mobile phone, a smart phone, a personal digital assistant (PDA), a portable multimedia player (PMP), a digital camera, a music player, a portable game console, a navigation system, etc.

The application processor 710 may execute applications, such as a web browser, a game application, a video player, etc. In an exemplary embodiment the application processor 710 may include a single core or multiple cores. For example, the application processor 710 may be a multi-core processor, such as a dual-core processor, a quad-core processor, a hexa-core processor, and the like. The application processor 710 may include an internal or external cache memory.

The application processor 710 may include the reconfigurable image scaling circuit 100 of FIG. 1 and/or the reconfigurable image scaling circuit 200 of FIG. 2 as hardware. The application processor 710 may execute a function of the reconfigurable image scaling circuit 100 of FIG. 1 and/or a function of the reconfigurable image scaling circuit 200 of FIG. 2 as software. Description of the reconfigurable image scaling circuit 100 or 200 will be omitted.

The connectivity unit 720 may perform wired or wireless communication with an external device. For example, the connectivity unit 720 may perform Ethernet communication, near field communication (NFC), radio frequency identification (RFID) communication, mobile telecommunication, memory card communication, universal serial bus (USB) communication, etc. In an exemplary embodiment connectivity unit 720 may include a baseband chipset that supports communications, such as global system for mobile communications (GSM), general packet radio service (GPRS), wideband code division multiple access (WCDMA), high speed downlink/uplink packet access (HSxPA), etc.

The memory device 750 may store data processed by the application processor 710, or may operate as a working memory. Each of memory cells included in the memory device 750 may include a write transistor, a read transistor and a metal oxide semiconductor (MOS) capacitor. The write transistor may include a gate electrode coupled to a write word line, a first electrode coupled to a write bit line and a second electrode coupled to a storage node. The read transistor may include a gate electrode coupled to the storage node, a first electrode coupled to a read word line and a second electrode coupled to a read bit line. The MOS capacitor may include a gate electrode coupled to the storage node and a lower electrode coupled to a synchronization control line. A synchronization pulse signal may be applied to the lower electrode of the MOS capacitor in synchronization with a write word line signal in a write operation and applied to the lower electrode of the MOS capacitor in synchronization with a read word line signal in a read operation such that a coupling effect may occur at the storage node through the MOS capacitor in response to the synchronization pulse signal. Therefore, a data retention time of the memory cell included in the memory device 750 may increase. As such, the memory device 750 may have a longer data retention time than a dynamic random access memory (DRAM) and a higher density than a static random access memory (SRAM).

The nonvolatile memory device 740 may store a boot image for booting the mobile system 700. For example, the nonvolatile memory device 740 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 730 may include at least one input device, such as a keypad, a touch screen, etc., and at least one output device, such as a speaker, a display device, etc. The power supply 760 may supply a power supply voltage to the mobile system 700.

In some embodiments, the mobile system 700 may further include an image processor, and/or a storage device, such as a memory card, a solid state drive (SSD), a hard disk drive (HDD), a CD-ROM, etc.

In some embodiments, the mobile system 700 and/or components of the mobile system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 10:
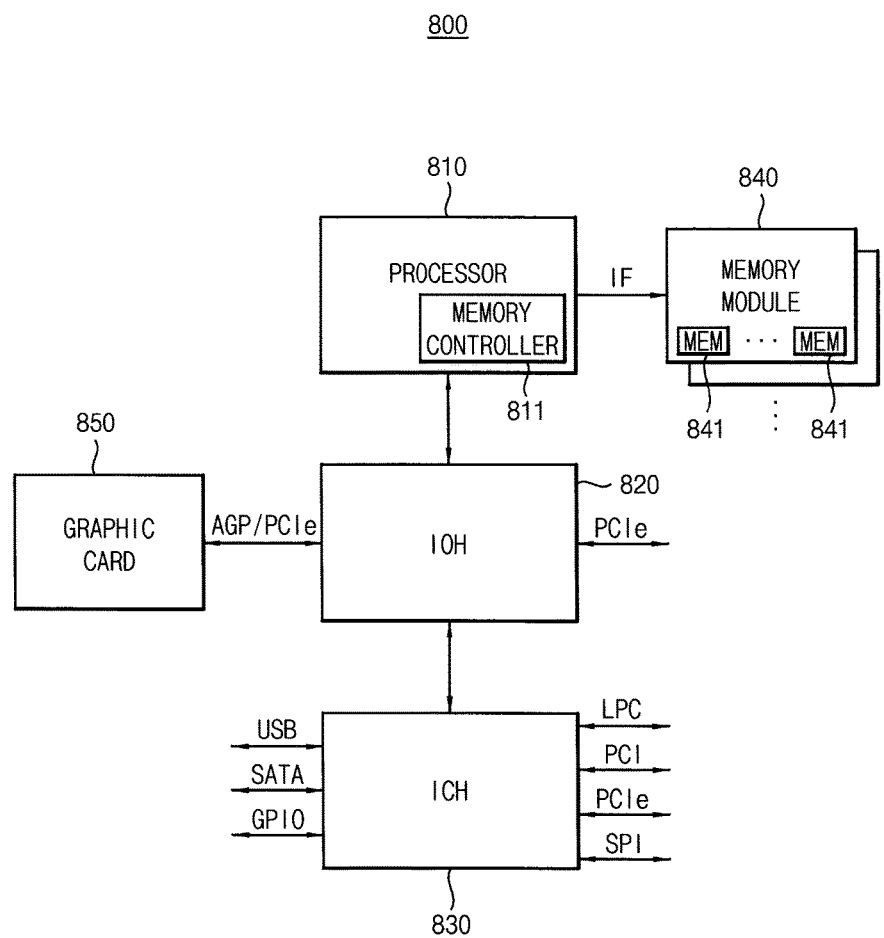
FIG. 10 is a diagram illustrating a computing system including a reconfigurable image scaling circuit according to exemplary embodiments.

FIG. 10 is a diagram illustrating a computing system including a reconfigurable image scaling circuit according to exemplary embodiments.

Referring to FIG. 10, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 810 may perform various computing functions, such as executing specific software for performing specific calculations or tasks. For example, the processor 810 may be a microprocessor, a central processor unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. Although FIG. 10 illustrates the computing system 800 including one processor 810, in some embodiments, the computing system 800 may include a plurality of processors.

The processor 810 may include the reconfigurable image scaling circuit 100 of FIG. 1 and/or the reconfigurable image scaling circuit 200 of FIG. 2 as hardware. The processor 810 may execute a function of the reconfigurable image scaling circuit 100 of FIG. 1 and/or a function of the reconfigurable image scaling circuit 200 of FIG. 2 as software. Description of the reconfigurable image scaling circuit 100 or 200 will be omitted.

The processor 810 may include a memory controller MEMORY CONTROLLER 811 for controlling operations of the memory module 840. The memory controller 811 included in the processor 810 may be referred to as an integrated memory controller (IMC). A memory interface IF between the memory controller 811 and the memory module 840 may be implemented with a single channel including a plurality of signal lines, or may bay be implemented with multiple channels, to each of which at least one memory module 840 may be coupled. In some embodiments, the memory controller 811 may be located inside the input/output hub 820. The input/output hub 820 including the memory controller 811 may be referred to as memory controller hub (MCH).

The memory module 840 may include a plurality of memory devices MEM 841 that store data provided from the memory controller 811. Each of memory cells included in the memory device 841 may include a write transistor, a read transistor and a metal oxide semiconductor (MOS) capacitor. The write transistor may include a gate electrode coupled to a write word line, a first electrode coupled to a write bit line and a second electrode coupled to a storage node. The read transistor may include a gate electrode coupled to the storage node, a first electrode coupled to a read word line and a second electrode coupled to a read bit line. The MOS capacitor may include a gate electrode coupled to the storage node and a lower electrode coupled to a synchronization control line. A synchronization pulse signal may be applied to the lower electrode of the MOS capacitor in synchronization with a write word line signal in a write operation and applied to the lower electrode of the MOS capacitor in synchronization with a read word line signal in a read operation such that a coupling effect may occur at the storage node through the MOS capacitor in response to the synchronization pulse signal. Therefore, a data retention time of the memory cell included in the memory device 841 may increase. As such, the memory device 841 may have a longer data retention time than a dynamic random access memory (DRAM) and a higher density than a static random access memory (SRAM).

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a QuickPath interconnect (QPI), a common system interface (CSI), etc. The input/output hub 820 may provide various interfaces with the devices. For example, the input/output hub 820 may provide an accelerated graphics port (AGP) interface, a peripheral component interface-express (PCIe), a communications streaming architecture (CSA) interface, etc. Although FIG. 10 illustrates the computing system 800 including one input/output hub 820, in some embodiments, the computing system 800 may include a plurality of input/output hubs.

The graphics card 850 may be coupled to the input/output hub 820 via AGP or PCIe. The graphics card 850 may control a display device for displaying an image. The graphics card 850 may include an internal processor for processing image data and an internal memory device. In some embodiments, the input/output hub 820 may include an internal graphics device along with or instead of the graphics card 850 outside the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub (ICH) 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc.

The input/output controller hub 830 may provide various interfaces with peripheral devices. For example, the input/output controller hub 830 may provide a universal serial bus (USB) port, a serial advanced technology attachment (SATA) port, a related art input/output (GPIO), a low pin count (LPC) bus, a serial peripheral interface (SPI), PCI, PCIe, etc.

In some embodiments, the processor 810, the input/output hub 820, and the input/output controller hub 830 may be implemented as separate chipsets or separate integrated circuits. In other embodiments, at least two of the processor 810, the input/output hub 820 and the input/output controller hub 830 may be implemented as a single chipset.

The exemplary embodiments may be applied to an arbitrary electronic device including an image scaling circuit. For example, the exemplary embodiments may be applied to a mobile phone, a smart phone, a personal digital assistant (PDA), a portable multimedia player (PMP), a digital camera.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific example embodiments disclosed, and that modifications to the disclosed example embodiments, as well as other example embodiments, are intended to be included within the scope of the appended claims.

What is claimed is:

1. A reconfigurable image scaling circuit comprising:
    a processor;
    a horizontal scalar to generate a horizontally scaled image data by scaling an input image data horizontally;
    a plurality of buffers configured to store the horizontally scaled image data; and
    a vertical scalar to generate an output image data by scaling the horizontally scaled image vertically using a vertical scaling method,
    wherein the horizontally scaled image data, which is stored in the plurality of the buffers, includes a plurality of first row data,
    wherein the output image data includes a second row data,
    wherein the vertical scalar generates the second row data based on a plurality of reference row data included in the plurality of the first row data,
    wherein the processor changes a mapping relation between the plurality of the reference row data and the plurality of the buffers based on a number of the plurality of the reference row data, and
    wherein the number of the plurality of the reference row data corresponds to a value of a tap of the vertical scaling method.

2. The reconfigurable image scaling circuit of claim 1, wherein the processor is configured to generate a control signal which represents the number of the plurality of the reference row data.

3. The reconfigurable image scaling circuit of claim 2, wherein the processor includes:
    a first register configured to store a user-defined value; and
    a second register configured to store a number of a plurality of first pixel data included in a row data included in the input image data,
    wherein the second register is configured to store a number of a plurality of second pixel data included in a row data included in the output image data.

4. The reconfigurable image scaling circuit of claim 3, wherein the number of the plurality of the reference row data is determined based on the user-defined value.

5. The reconfigurable image scaling circuit of claim 3, wherein the number of the plurality of the reference row data is determined based on the number of the plurality of the first pixel data and the number of the plurality of the second pixel data.

6. The reconfigurable image scaling circuit of claim 5, wherein the number of the plurality of the reference row data is inversely proportional to the number of the plurality of the first pixel data in response to the number of the plurality of the first pixel data being smaller than the number of the plurality of the second pixel data.

7. The reconfigurable image scaling circuit of claim 3, further comprising a mode storage configured to store a mode signal,
wherein the reconfigurable image scaling circuit operates in a first mode or a second mode according to the mode signal.

8. The reconfigurable image scaling circuit of claim 7, wherein the number of the plurality of the reference row data is determined based on the user-defined value in the first mode.

9. The reconfigurable image scaling circuit of claim 7, wherein the number of the plurality of the reference row data is determined based on the number of the plurality of the first pixel data and the number of the plurality of the second pixel data in the second mode.

10. A reconfigurable image scaling circuit comprising:
a plurality of buffers;
a vertical scalar;
a horizontal scalar; and
a processor which includes a first register and a second register,
wherein the first register is configured to store a user-defined value,
wherein the second register is configured to store a number of a plurality of first pixel data included in a row data included in an input image data and a number of a plurality of second pixel data included in a row data included in an output image data,
wherein:
in response to the number of the plurality of the first pixel data being smaller than the number of the plurality of the second pixel data, the plurality of the buffers store the input image data, the vertical scalar generates a vertically extended image data by extending the input image data vertically based on a first vertical scaling method,
the input image data includes a plurality of first row data,
the vertically extended image data includes a second row data which is generated based on a plurality of first reference row data included in the plurality of the first row data,
the horizontal scalar generates the output image data by extending the vertically extended image data horizontally, and
the processor changes a mapping relation between the plurality of the first reference row data and the plurality of the buffers based on a number of the plurality of the first reference row data; and
wherein:
in response to the number of the plurality of the first pixel data being bigger than the number of the plurality of the second pixel data, the horizontal scalar generates a horizontally reduced image data by reducing the input image data horizontally, the plurality of the buffers store the horizontally reduced image data, and the vertical scalar generates the output image data by reducing the horizontally reduced image data vertically based on a second vertical scaling method,
the vertically reduced image data includes a plurality of third row data, the output image data includes a fourth row data which is generated by the vertical scalar based on a plurality of second reference row data included in the plurality of the third row data, and
the processor changes the mapping relation between the plurality of the second reference row data and the plurality of the buffers based on a number of the plurality of the second reference row data.

11. The reconfigurable image scaling circuit of claim 10, wherein the number of the plurality of the first reference row data and the number of the plurality of the second reference row data are determined based on the user-defined value.

12. The reconfigurable image scaling circuit of claim 10, wherein the number of the plurality of the first reference row data is determined based on the number of the plurality of the first pixel data, and
the number of the plurality of the second reference row data is determined based on the number of the plurality of the second pixel data.

13. The reconfigurable image scaling circuit of claim 10, wherein the number of the plurality of the first reference row data and the number of the plurality of the second reference row data are determined based on the user-defined value in a first mode, and
wherein the number of the plurality of the first reference row data is determined based on the number of the plurality of the first pixel data and the number of the plurality of the second reference row data is determined based on the number of the plurality of the second pixel data, in a second mode.

14. The reconfigurable image scaling circuit of claim 13, further including a mode storage configured to store a mode signal,
wherein the reconfigurable image scaling circuit operates in the first mode or the second mode according to the mode signal.

15. A method performed by a controller included in a reconfigurable image scaling circuit, the method comprising:
generating a horizontally scaled image data by scaling an input image data horizontally, the horizontally scaled image data including first row data which includes a plurality of reference row data;
determining whether a mode signal stored in a mode storage is deactivated and whether the number of the plurality of the reference row data is fixed;
determining the number of the plurality of the reference row data based on a user-defined value stored in a first register of the controller in response to the mode signal being deactivated and the number of the plurality of reference row data being fixed;
determining the number of the plurality of the reference row data based on a number of a plurality of first pixel data and a number of a plurality of second pixel data, which are stored in a second register of the controller, in response to the mode signal being activated and the number of the plurality of reference row data not being fixed;
reconfiguring buffers included in the reconfigurable image scaling circuit based on the determined number of the plurality of the reference row data;
storing the horizontally scaled image data in the buffers; and
generating an output image data by scaling the horizontally scaled image vertically by using a vertical scaling method, the output image data including a second row data which is generated based on the plurality of the reference row data, wherein the number of the plurality of the reference row data corresponds to a value of a tap of the vertical scaling method.

16. The method of claim 15, wherein the determining the number of the plurality of the reference row data based on the number of the plurality of the first pixel data and the number of the plurality of the second pixel data comprises determining the number of the plurality of the reference row data being inversely proportional to the number of the plurality of the first pixel data in response to the number of the plurality of the first pixel data being smaller than the number of the plurality of the second pixel data.

* * * * *